United States Patent

Sakumoto et al.

[11] Patent Number: 5,926,131
[45] Date of Patent: Jul. 20, 1999

[54] GPS RECEIVING APPARATUS

[75] Inventors: Kazumi Sakumoto; Hiroshi Odagiri; Chiaki Nakamura; Keisuke Tsubata, all of Chiba, Japan

[73] Assignee: Seiko Instruments Inc., Japan

[21] Appl. No.: 08/926,889

[22] Filed: Sep. 10, 1997

[30] Foreign Application Priority Data

Sep. 11, 1996 [JP] Japan .................................. 8-240775
Mar. 25, 1997 [JP] Japan .................................. 9-072268
Aug. 22, 1997 [JP] Japan .................................. 9-226366

[51] Int. Cl.$^6$ .............................. G01S 5/02; H04B 9/185
[52] U.S. Cl. .......................................... 342/357; 701/213
[58] Field of Search ................................. 342/357, 352; 701/213; 340/994, 998

[56] References Cited

U.S. PATENT DOCUMENTS 4,485,383  11/1984  Maher ..................................... 343/352
5,623,260   4/1997  Jones ..................................... 340/994
5,657,010   8/1997  Jones ..................................... 340/994

*Primary Examiner*—Thomas Tarcza
*Assistant Examiner*—Dao L. Phan
*Attorney, Agent, or Firm*—Adams & Wilks

[57] ABSTRACT

An improved GPS receiving apparatus may be worn on a user's arm and is not affected by the user's periodic arm swinging motion. A GPS signal receiver receives a GPS signal from GPS satellites, the receiver being mountable on a user's arm. A display is provided for displaying information based upon an output of the GPS signal receiver. An arm swing detecting circuit including an acceleration sensor detects the periodic swinging motion of the user's arm and outputs a corresponding periodic signal. A timing circuit sets a predetermined time during respective arm swing movements at which a GPS signal receiving operation will be performed based upon the periodic signal output by the arm swing detecting circuit. Operation timing of the GPS signal receiver is performed based on the output signal of the timing circuit so that a GPS signal receiving operation is performed at the same time during each cycle of periodic arm swinging motion to thereby cancel the effect of the periodic arm swinging motion.

20 Claims, 12 Drawing Sheets

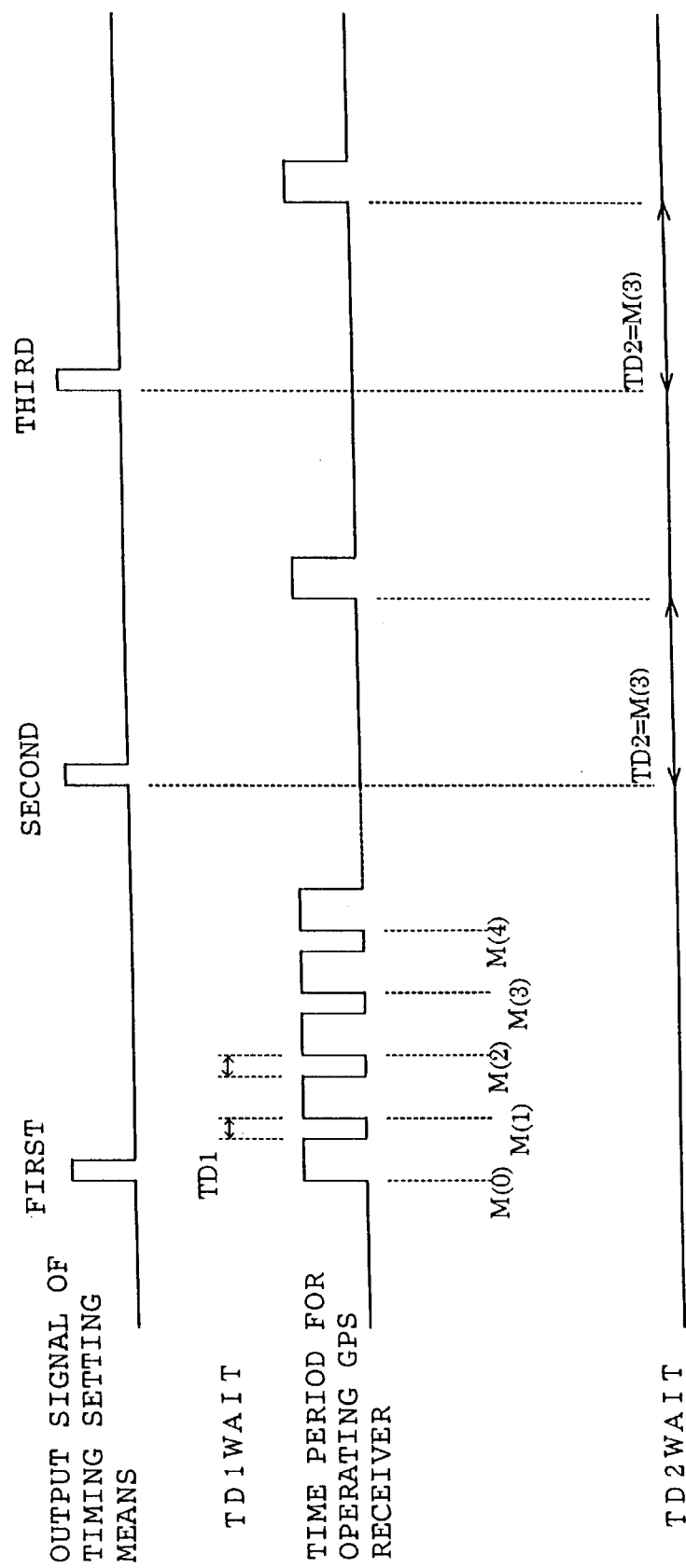

GPS RECEIVING APPARATUS

BACKGROUND OF THE INVENTION

This invention relates to a GPS receiving apparatus that receives signals from a GPS (Global Positioning System) satellite and measure the position and speed of the signal receiving apparatus. In particular, the present invention relates to a GPS apparatus that is capable of being held by or attached to a human arm to measure the position of a human who is walking or running, as well as moving speed and moving distance.

The GPS system has 24 GPS satellites revolving at a rate of 12 hours per one turn on six orbits at an inclination angle of 55 degrees above approximately 20,200 Km around the earth. The navigation data required for position location is transmitted from at least three to four or more satellites and received by a receiver installed on the earth so that a mobile body having the receiver mounted thereon may have its position location calculated, including the relative position, the moving speed, etc. It is also possible to determine a velocity vector of the mobile body by measuring a Doppler frequency contained in a carrier wave. Although in FIG. 3 the transmission wave by the GPS involves two kinds, i.e., L1 with a frequency of 1.57542 GHz and L2 with a frequency of 1.22760 GHz, the ordinary position location utilizes L1. L1 is subjected to PSK modulation by a pseudo noise code (a synthetic wave of a C/A code for satellite identification and navigation data such as satellite orbit information, time information, etc.) and spread spectrum, for transmission. The 1.57542-GHz signal received by an antenna 300 is amplified by an L-passband amplifying circuit 301, converted by a down-converter means 302 into a first IF (intermediate frequency) signal of several tens of MHz to 200 MHz, and further rendered into a second IF signal of approximately 2 MHz to 5 MHz. The second IF signal is inputted to a voltage comparator 303 so that it is digital-converted by a clock of several times the IF signal by using the voltage comparator 303. The output of the comparator 303 is spread spectrum data. In a message decoding circuit 304, the digital data outputted by the voltage comparator 303 is subjected to spread spectrum by a C/A code that is the same pseudo noise code as that of the satellite, thereby obtaining carrier wave phase information corresponding in pseudo distance to navigation data. This operation is performed with respect to a plurality of satellites so that a position location calculating means 306 may accurately determine position data from the navigation data. Typically, such data is acquired from four satellites. The position data determined by the position location calculating means 306 is outputted to a CPU that performs controls on all operations of portable apparatuses or devices. Or otherwise, it is outputted outside as a digital signal. As the size reduction in GPS receivers advances, considerations have been made for utilizing the GPS receivers for purposes of determining human running motion and walking distance as disclosed in Unexamined Published Japanese Patent Application No. H6-118156.

However, many problems are present where the conventional GPS receiver is to be utilized for measuring the moving speed or moving distance of human bodies. In the interest of portability, it is desired that such a receiver be compact and capable of being carried on the arm. However, when considering the case of attaching it to the human arm, there is a disadvantage in that the moving speed of a person when walking or running per se cannot be measured due to variations in the position to be identified resulting from back-and-forth arm swing relative to the direction of advancement of the human body or the difference between the moving speed of the human body and the arm swing speed. FIG. 4 shows a typical diagram of speed information to be obtained when the GPS receiving apparatus is carried on the arm of a person running. In FIG. 4, the abscissa denotes elapsed time and the ordinate denotes speed, while a broken line represents the mean body moving speed and a solid line denotes arm swing speed. The duration that the arm swing speed is increasing with respect to the mean body moving speed corresponds to the period of time that the arm is being forwardly swung. In this instance, the arm swing speed is higher than the body moving speed. Conversely, when the arm is swung in a direction of the human body opposite to the advancing direction, the arm speed is lower than the mean body moving speed. The intersections a, b with the mean moving speed are the points that the arm speed and the mean body moving speed become equal to each other. In this manner, the GPS receiving apparatus when carried on the arm is affected by the movement. In order to measure the body mean moving speed in this state, there is a necessity of operating the GPS receiving apparatus by applying a frequency twice or higher the frequency of arm swinging to conduct speed measurement and then integrate the results thereof. However, this method is nothing more than the continuous operation of a high-power-consumption GPS receiving apparatus, and involves significant hindrance to the realization a portable and small-sized apparatus such as that having a watch type configuration. There also has been a problem in that, besides the speed, when the GPS receiving apparatus is carried on the arm in order to obtain location information during walking or running, accurate measurement is impossible due to the effect of the arm swing motion.

SUMMARY OF THE INVENTION

It is an object of the present invention to improve the measurement accuracy of a GPS receiving apparatus carried on an arm by performing position location and moving-speed measurement at a predetermined arm position during each period of arm swinging motion so as to cancel the effect of arm swing motion.

Another object of the present invention is to reduce power consumption of a GPS receiving apparatus.

BRIEF DESCRIPTION OF THE DRAWINGS

FIG. 12 is a timing chart showing the operation of the embodiment of the GPS receiving apparatus of the present invention.

DETAILED DESCRIPTION OF THE PREFERRED EMBODIMENTS

1. Explanation of First Embodiment

Figure 1:
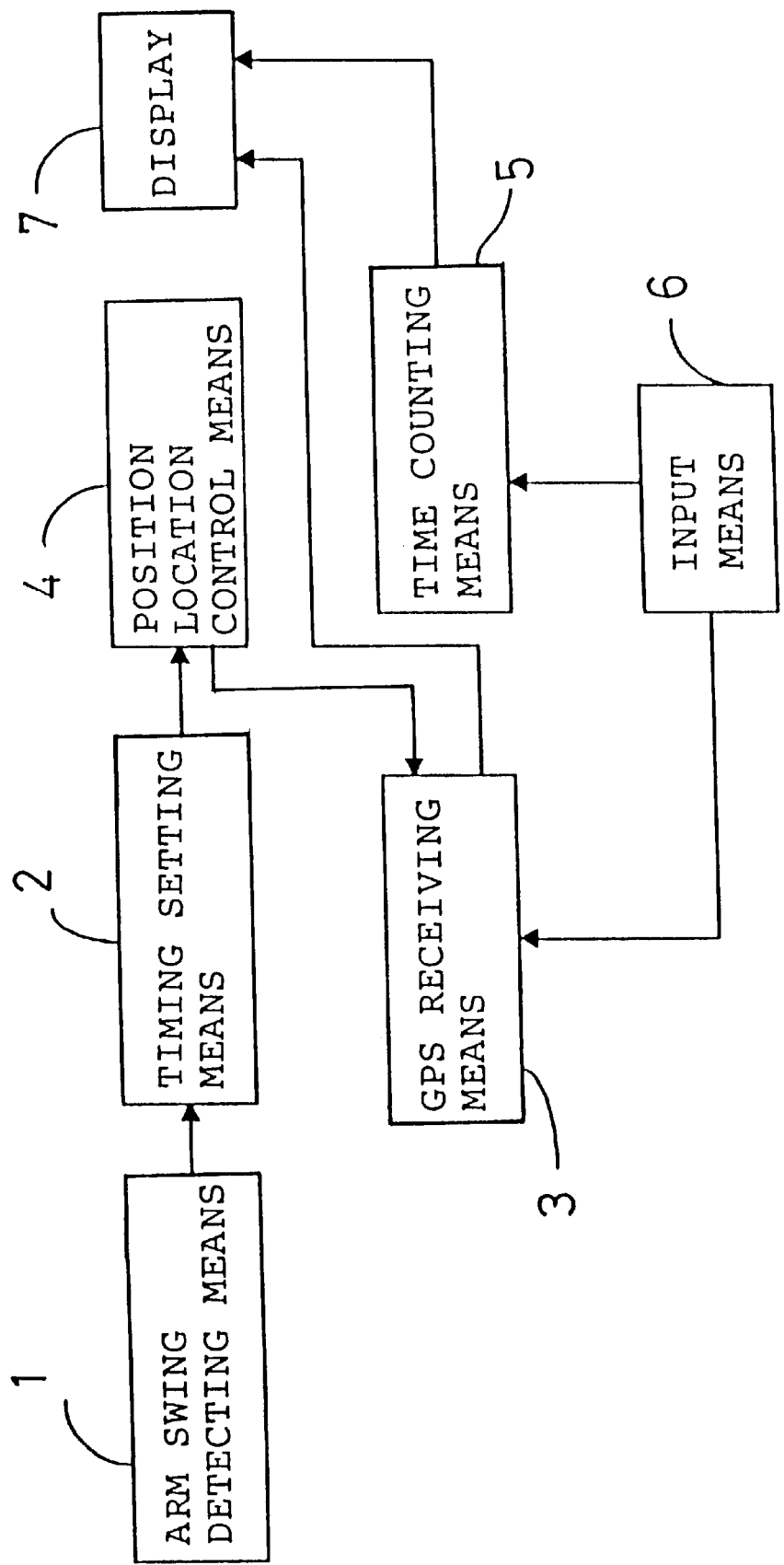
FIG. 1 is a functional block diagram showing a configuration of a first embodiment of the present invention.

FIG. 1 is a functional block diagram showing the basic configuration of a GPS receiving apparatus according to a first embodiment of the present invention, wherein a basic configuration is given for carrying out GPS signal receiving operation at arbitrary timing during a specific arm position of arm swing periodic motion. Reference numeral 1 denotes an arm swing detecting means for detecting a periodic signal of arm swinging in human walking or running. Reference numeral 2 denotes a timing setting means for outputting a periodic signal extracted, at particular timing in each period, from a continuous periodic signal outputted by the arm swing detecting means. 4 is a position location control means for controlling the receiving operation of the GPS signal receiving means 3 based on an output signal from the timing setting means 2. 5 is a time counting means for generating a reference clock signal to control time to provide a clock function, outputting actual time hour information to a display means 7. The display means 7 displays speed information and coordinate information received by the GPS signal receiving means 3, as actual well as time information outputted from the time counting means 5. 6 is an input means for controlling the setting of the time counting means 5 and the operation of the GPS signal receiving means 3.

Figure 5:
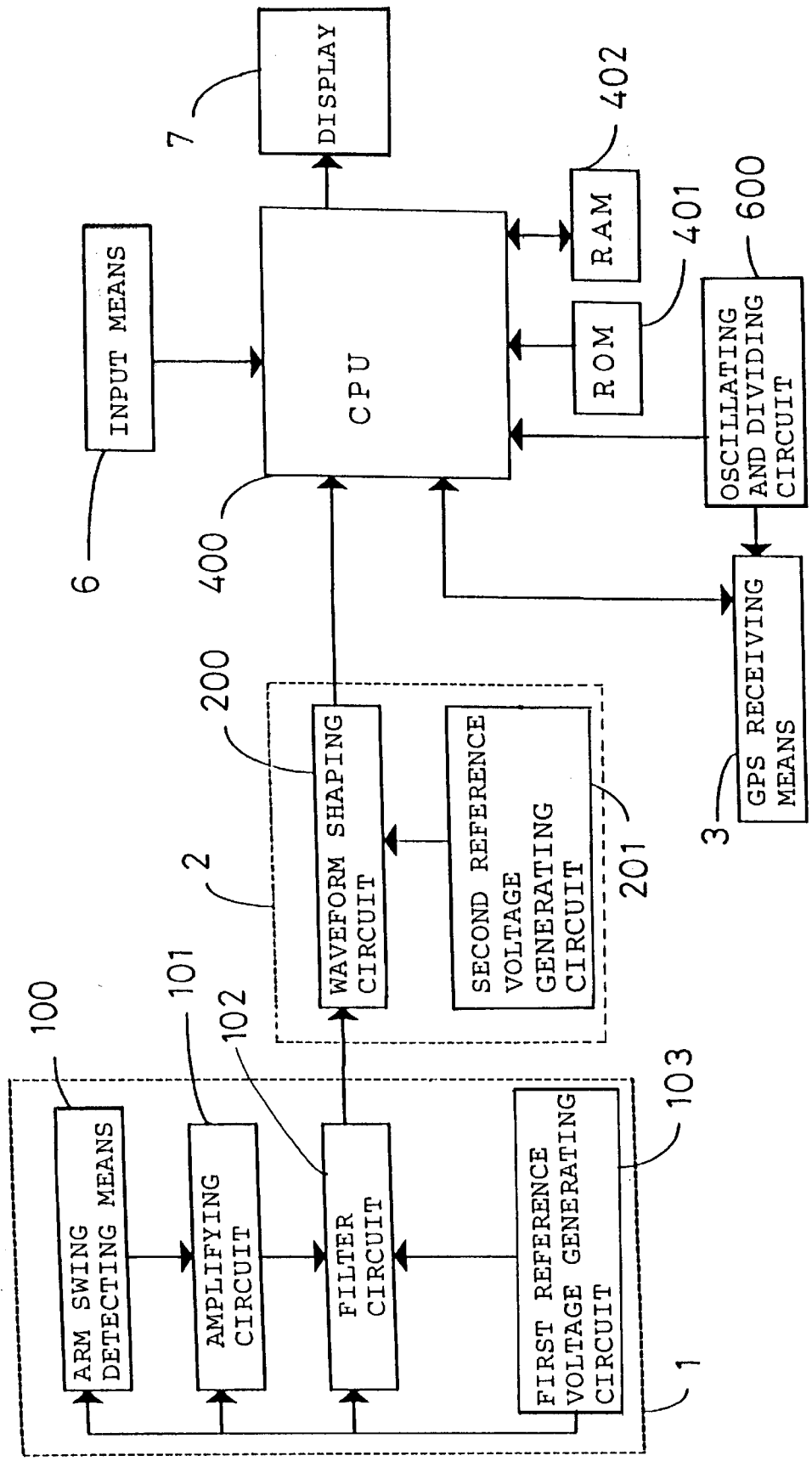
FIG. 5 is a functional block diagram of a detailed first embodiment of the present invention.

FIG. 5 is a functional block diagram showing in greater detail the first embodiment. The arm swing detecting means 1 comprises an arm swing detecting circuit 100 for detecting a periodic signal on arm swing motion, an amplifying circuit 101 for amplifying an output thereof, a filter circuit 102 for elimination of commercial power noises, etc. out of frequency components contained in the arm swing signal amplified by the amplifying circuit 101 to thereby improve the S/N ratio for outputting to the timing setting means 2, and a reference voltage generating circuit 103 for supplying reference voltages respectively to the arm swing detecting circuit 100, the amplifying circuit 101 and the filter circuit 102. The timing setting means 2 is formed by a waveform shaping circuit 200 and a second reference voltage generating circuit 201, so that the same means converts, through the waveform shaping circuit 200, a continuous analog signal into a digital signal "1" or "0" using, as a reference, the voltage generated by the second reference voltage generating circuit to thereby output the digital signal to the CPU 400. The position location control means 4 and the time counting means 5, shown in FIG. 1, is configured in combination by the CPU 400, a ROM 401 programmed with operating steps therefor, a RAM 402 principally utilized as a temporary storage site for data, and an oscillating and frequency-dividing circuit 600.

Figure 6:
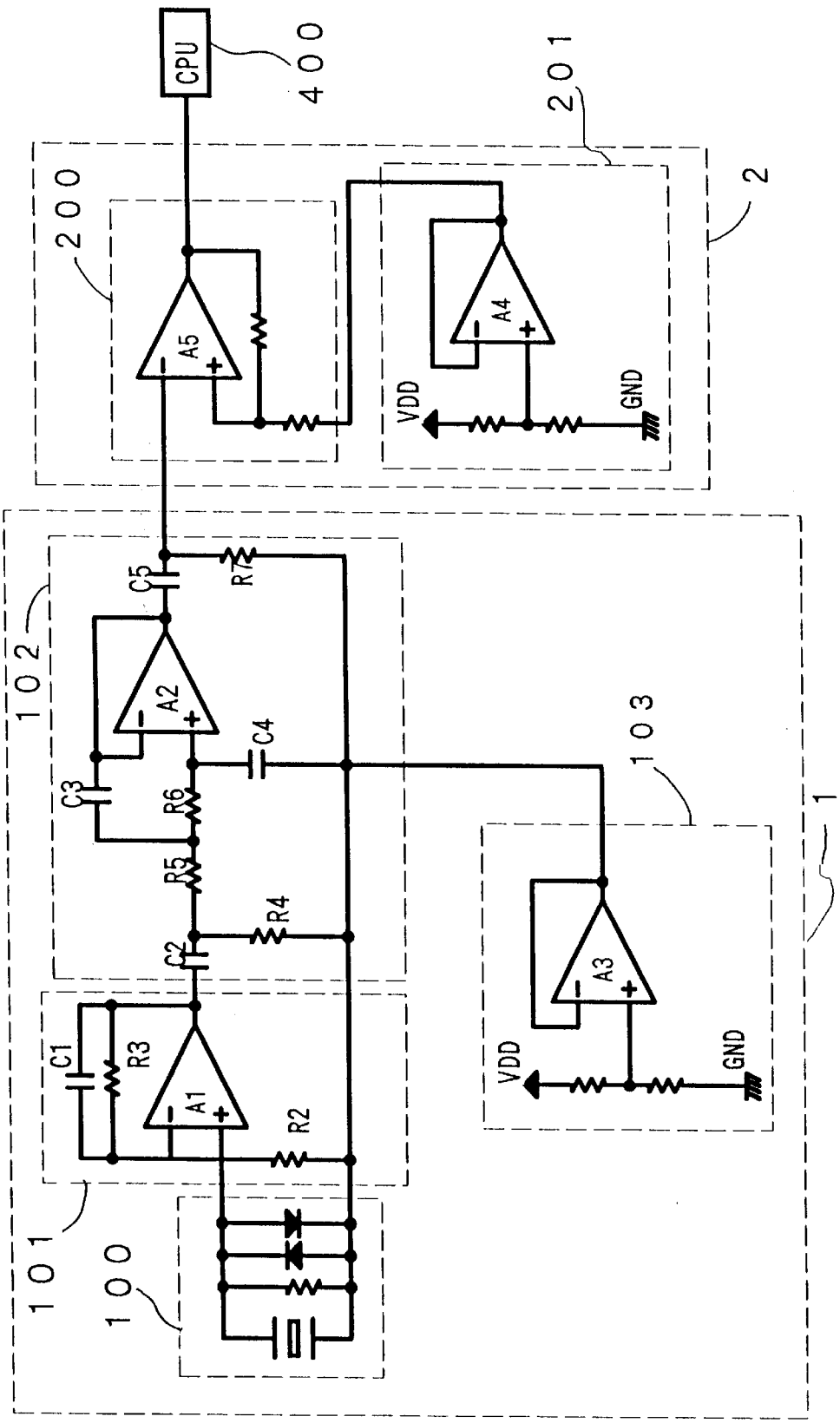
FIG. 6 is a circuit schematic diagram showing embodiment of an arm swing detecting means and a timing setting means.

The arm swing detecting means 1 and the timing setting means 2 are embodied in FIG. 6 as a detailed circuit form, for explaining the operation thereof. The arm swing detecting circuit 100 employs an acceleration sensor of a cantilever structure having a piezoelectric element bonded thereto so as to output a vibrating displacement in an electric charge form responsive to arm swinging. The amplifying circuit 101 comprises a non-inverting amplifying circuit formed by an OP amplifier, resistances R2, R3, and a capacitor C1, so that the same circuit amplifies, in a ratio of resistance R2 and R3, the electric charge generated responsive to vibratory displacement by the piezoelectric element, for outputting to the filter circuit 102.

The filter circuit 102 is a band-pass filter having a low-range cut off frequency $Fcl=1/(2\pi R5\sqrt{(C3C4)})$ and a high-range cut off frequency $Fch=1/(2\pi C2R4)$, which selectively outputs a frequency signal generated by arm swing motion to the timing setting means 2. The timing setting means 2 is formed by an OP amplifier A5 constituting a hysteresis comparator and a second reference voltage generating circuit 201 so that the same means converts the timing, at which agreement is met between the continuous analog voltage signal outputted from the filter circuit 102 and an arbitrary voltage generated by the second reference voltage generating circuit 201, into a digital pulse signal "1" or "0" for cutting out. This timing setting means 2 makes possible taking out certain timing in one period of arm swing motion.

Figure 4:
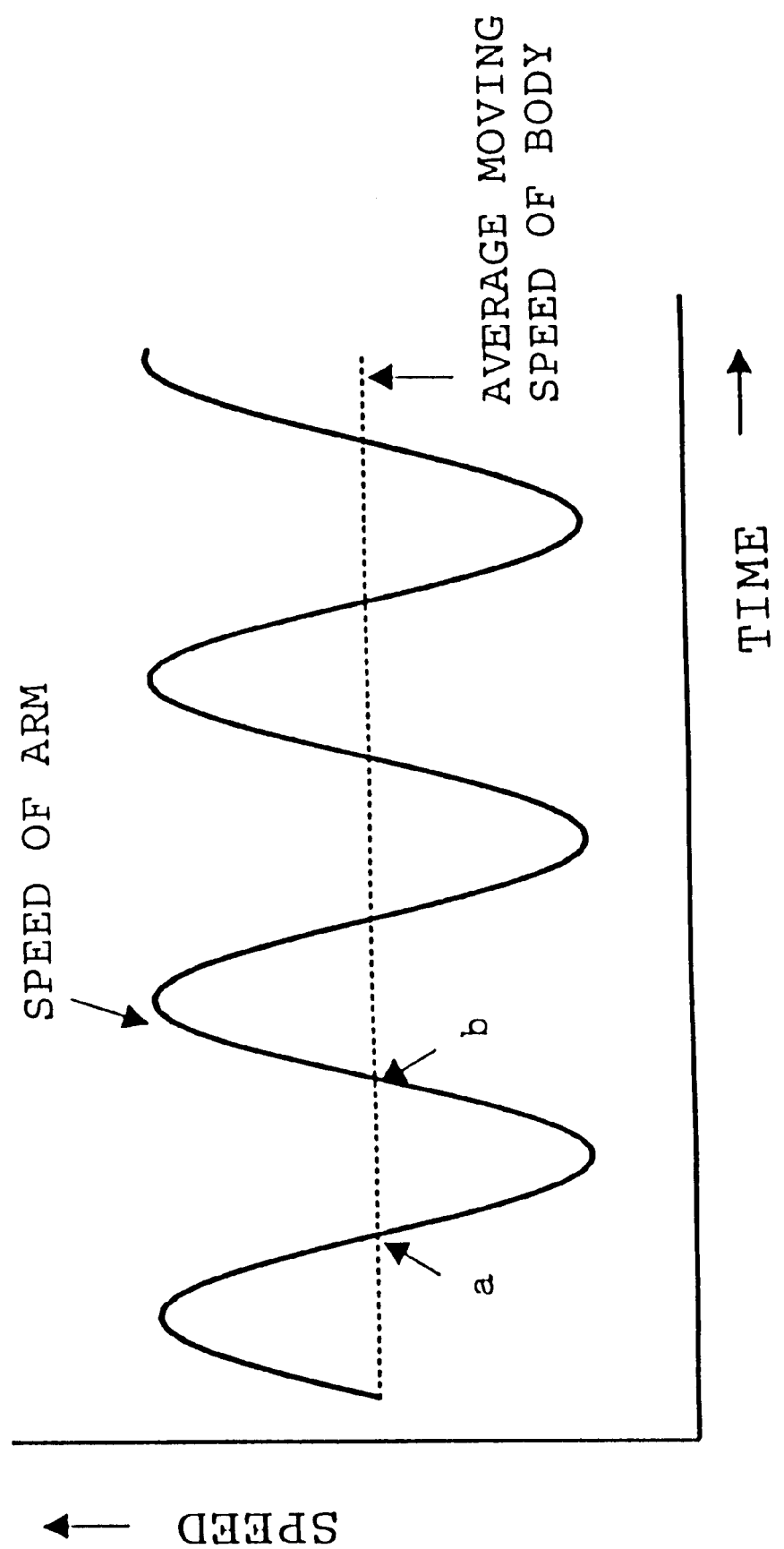
FIG. 4 is a diagram showing an explanatory speed information obtained where a user is running with a GPS receiving apparatus carried on an arm.
Figure 7:
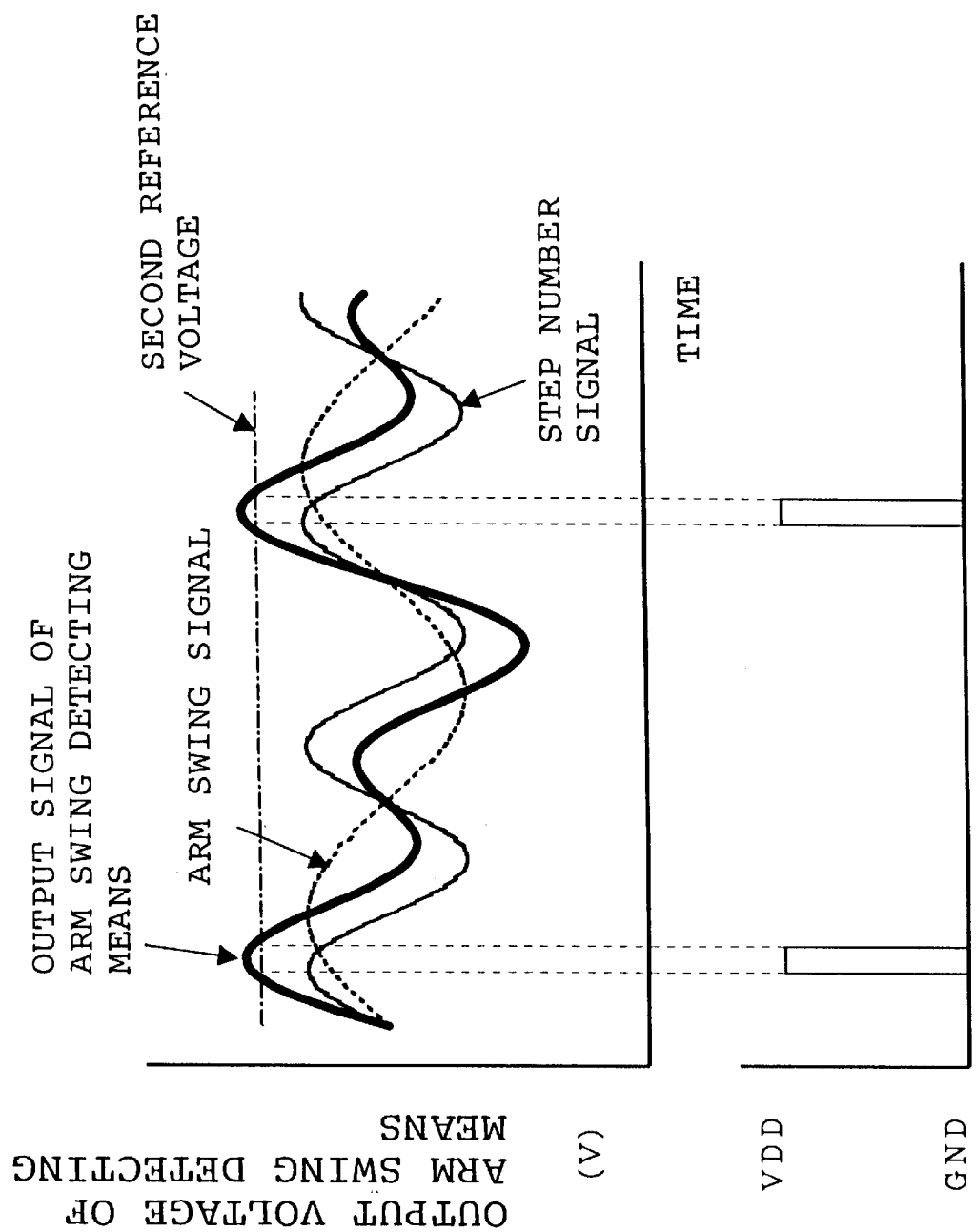
FIG. 7 is an explanatory diagram showing the relationship between human motion and output of a timing setting means.

The relationship between the human motion and the output of the timing setting means 2 will be explained with reference to FIG. 7. The output signal of the arm swing detecting means 1 attached to an arm exhibits a waveform generally represented by a bold line as a synthetic signal of a periodic signal generated by arm swing motion denoted by a broken line and a step number signal generated by an impulse upon landing of the foot denoted by a thin solid line. This signal, if converted into a digital pulse signal by the voltage as a reference of the second reference voltage generating circuit 201 of the timing setting means 2, makes possible trapping an instant at which the foot lands at an interval of five steps, for the case of FIG. 7. The reference voltage of the second reference voltage generating circuit 201, if rendered variable, makes possible detection on other operating states. For example, it is possible to detect a zero acceleration output of the arm swing signal, i.e. a turning point in arm movement by lowering the second reference voltage toward 0 V. In this manner, the human motion at a particular position can be detected by rendering variable the setting of the second reference voltage. It is also possible to set to the timing a, b, as explained in FIG. 4, at which the mean body moving speed and the arm speed become equal. If setting to such timing is made, the CPU 400 causes the GPS signal receiving means 3 to operate through the position location control means programmed in the ROM 401, to obtain speed data and coordinate data from the GPS signal receiving means 3. The obtained data is stored in the RAM 402, and displayed by the display means 7. As a result, the moving speed can be efficiently determined while canceling the arm motion.

As stated above, it is possible in the present invention to measure the body moving speed with accuracy and at low power consumption, even during movement, in a state that the GPS receiver is carried on the arm. Incidentally, the embodiment of the arm swing detecting means and the timing setting means, shown in FIG. 6, is for explaining the basic operation thereof, being not capable of every case of motion.

Figure 8:
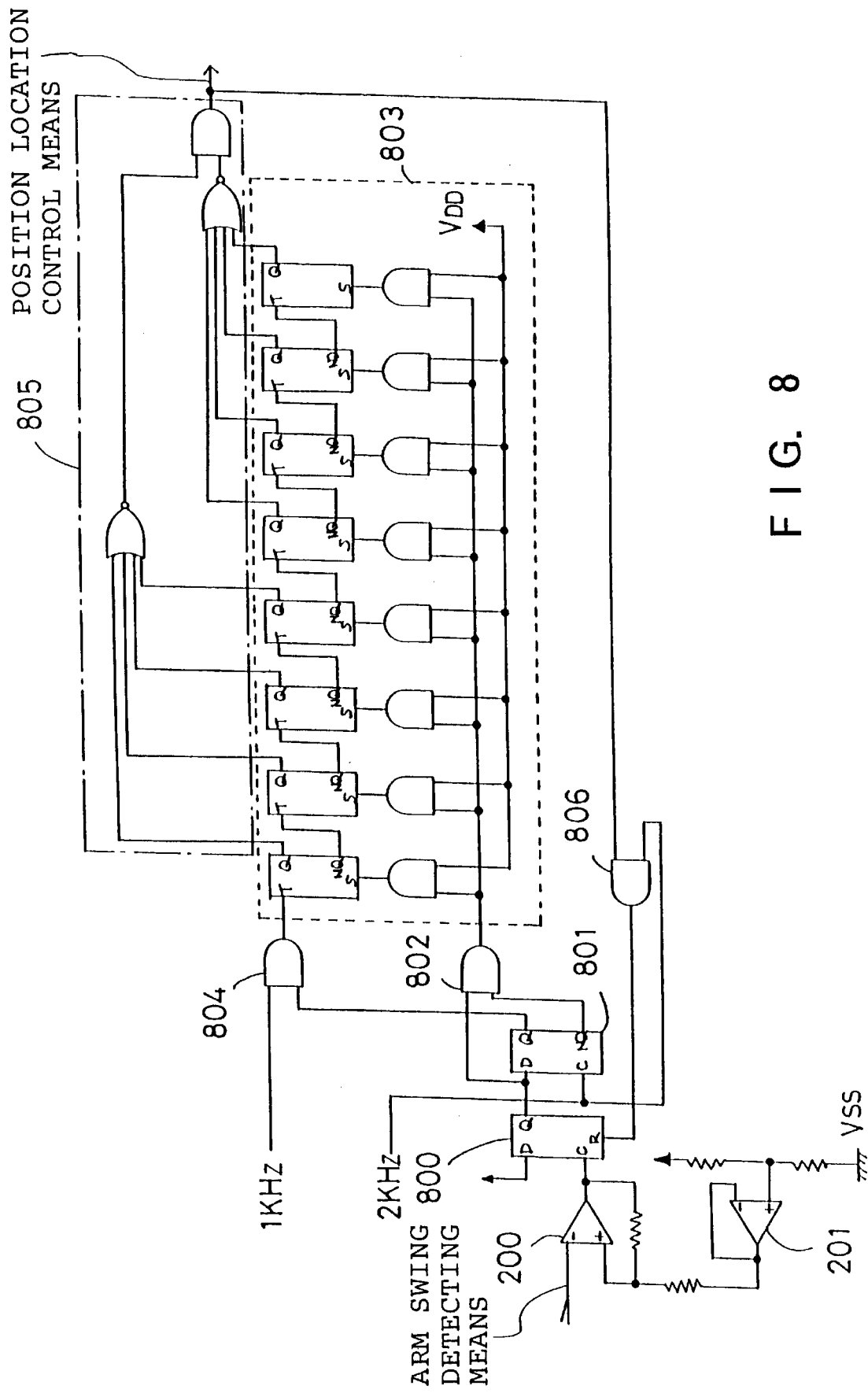
FIG. 8 is a circuit schematic diagram showing another embodiment of the timing setting means of the present invention.

Then another detailed embodiment of the timing setting means 2 will be shown in FIG. 8 to explain the operation thereof. A digital circuit is added to a stage after converting the continuous output signal of the arm swing detecting means 1 into the digital pulse signal by the hysteresis comparator 200 and the second reference voltage generating circuit 201 explained in FIG. 6. The output of the hysteresis comparator 200 is connected to a clock terminal C of a DF/F 800. The DF/F 800 has a data terminal D connected to a positive power source VDD so that the output Q of the DF/F 800 becomes "1" at timing of rise in a pulse signal generated by the hysteresis comparator 200 to thereby bring the following digital circuit into operation. The output Q of the DF/F 800 is connected to a terminal D of a DF/F 801 supplied at a terminal C with 2 KHz from the oscillation and frequency-dividing circuit 600, and to an AND gate 802. When the output Q of the DF/F 800 becomes "1", the AND gate 802 having one input connected to a terminal NQ of the DF/F 801 has an output of "1". The output "1" of the AND gate 802 is maintained until the output Q of the DF/F 800 reads "1" in the output Q of the DF/F 800, presetting a downcount value to an 8-bit preset downcounter 803. This presetting value may be a fixed value, or such a value that the CPU 400 is varied in relation to the arm swing pitch period outputted by the arm swing detecting means 1. The embodiment of FIG. 8 is a case wherein all are set to "1". After the 8-bit preset downcounter 803 is set by a count value, when the Q output of the DF/F 800 becomes "1", the AND gate 804, to which connected are the Q output of the DF/F 801 and the 1-KHz output from the oscillation frequency-dividing circuit 600, begins to supply 1 KHz to the 8-bit preset downcounter 803. Starting a downcount, the 8-bit preset downcounter 803 after lapse of approximately 256 ms becomes to have a value 0 because in the present embodiment the preset value is 256 and the clock is 1 KHz. Thereupon, a 0-detecting circuit 805 for detecting 0 in the 8-bit preset downcounter 803 has its output "1", to interrupt to the CPU 400 to which the output of the 0-detecting circuit is connected. Receiving the interrupt, the CPU 400 causes the GPS signal receiving means to operate to measure the speed or position. Simultaneously, the DF/F 800 is reset by the AND gate 806 having inputs connected to the 0-detecting circuit 805 and 2-KHz output of the frequency-dividing circuit 600. This completes the series of operations due to the output Q setting to "1" in the DF/F 800 at the rise timing in the pulse signal generated by the hysteresis comparator 200. Then a pulse signal is waited for in the output of the hysteresis comparator 200.

As explained on the operation so far, the operating timing of the GPS signal receiving means 2 can be finely set, in synchronism with the arm swing period signal detected by the arm swing detecting means, by making the timing setting means in a digital circuit. Furthermore, if a pitch number converting means is provided for converting the period of the timing setting signal outputted by the timing setting means 2 into a pitch number per unit time to set a reset value of the 8-bit preset downcounter 803, it is possible to optimally set the operation timing for the GPS signal receiving means 3 even where the moving state is changed. If this particular timing is set to such a point that the arm swing speed and the body moving speed become equal as shown in the typical diagram of FIG. 4, the display of moving speed information is possible at low power consumption and with high accuracy. Furthermore, the moving speed can be determined by providing a moving speed calculating means for determining from position information measured intermittently and time information obtained from the time counting means.

2. Explanation of Second Embodiment

Figure 2:
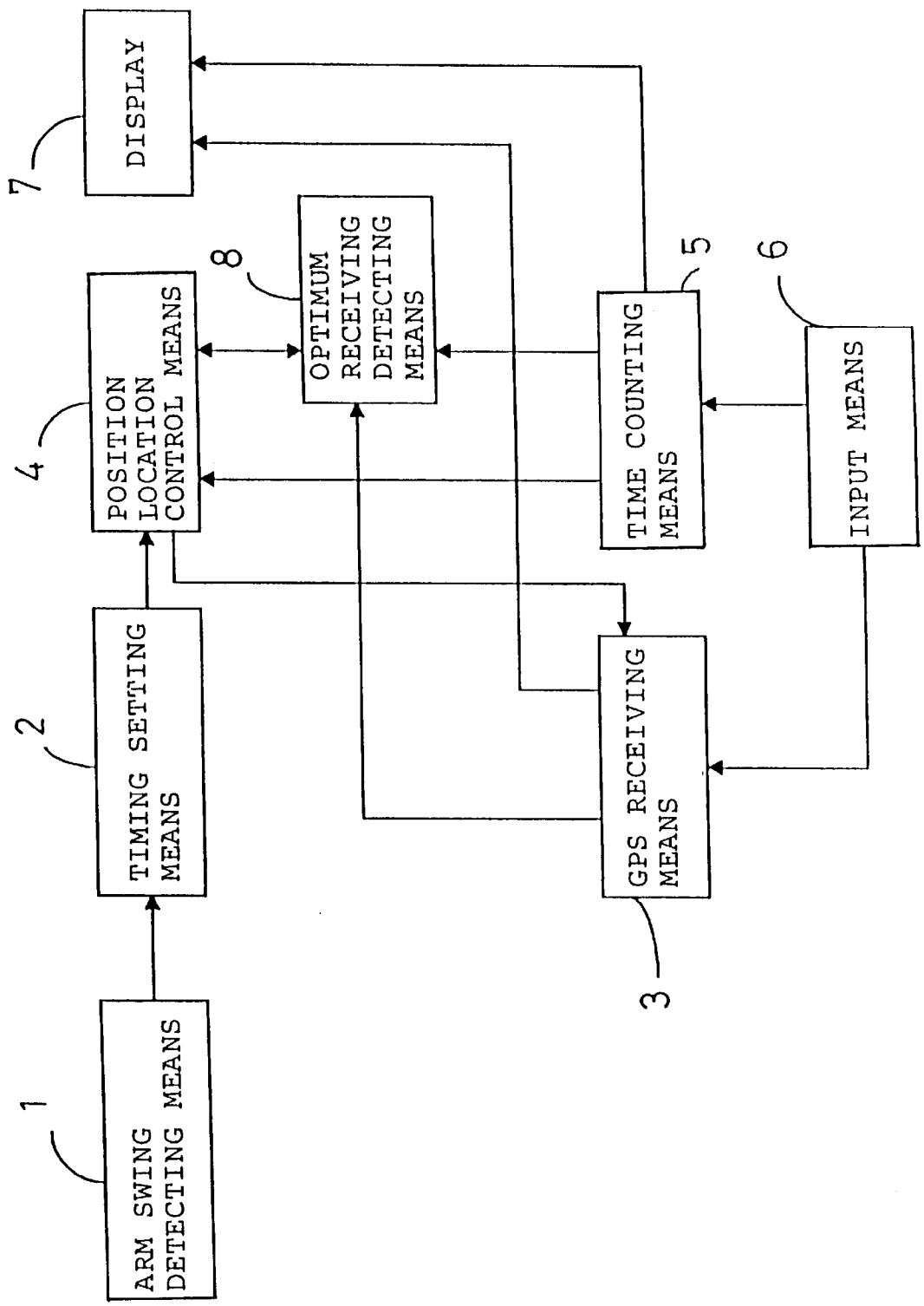
FIG. 2 is a functional block diagram showing a configuration of a second embodiment of the present invention.
Figure 3:
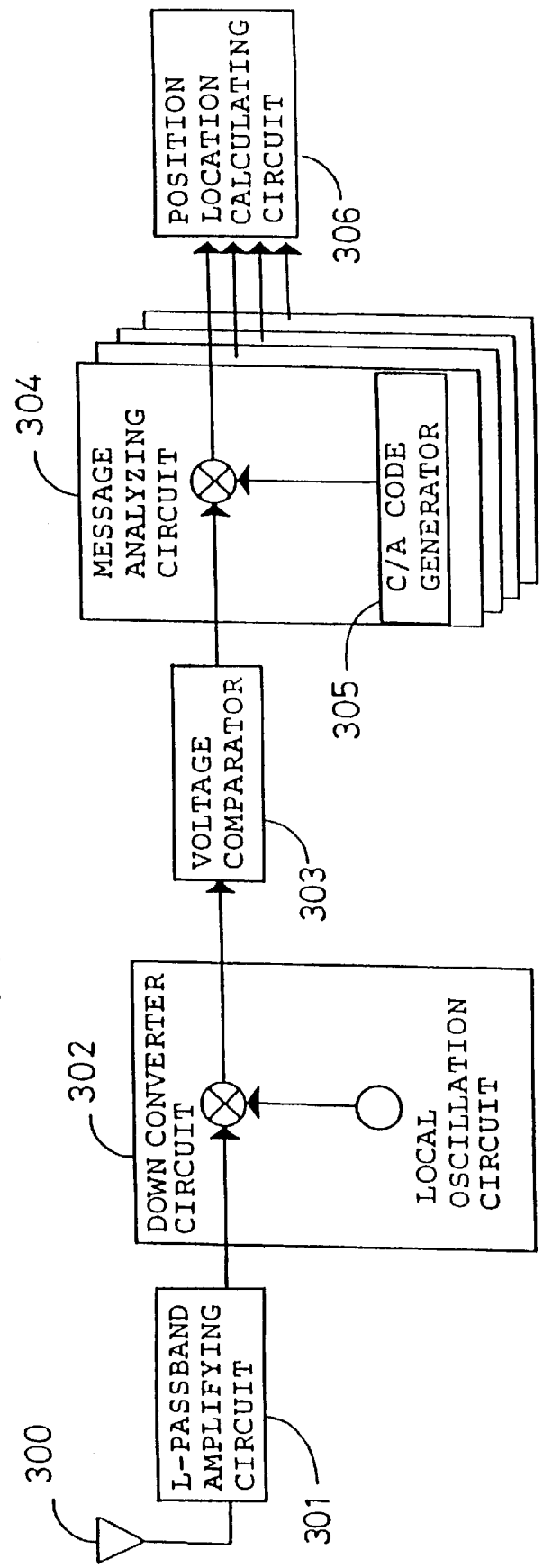
FIG. 3 is a functional block diagram showing a configuration of a conventional GPS receiving apparatus.

FIG. 2 shows a functional block diagram of a GPS receiving apparatus according to a second embodiment of the present invention. FIG. 2 is different from FIG. 1 in that an optimum receiving state detecting means 8 is provided. The optimum receiving state detecting means 8 causes the GPS signal receiving means 3 to perform several times of reception within one period of arm swing motion detected by the arm swing detecting means 1. The best timing in terms of receiving sensitivity or accuracy is detected to operate the position location control means 4 in that state. The GPS receiving apparatus provided with the optimum receiving state detecting means 8 can be realized by the configuration of FIG. 5 explained hereinbefore. The operation of optimum receiving state detection is realized by the CPU 400, ROM 401, and the RAM 402. The operation of the second embodiment will be explained hereinbelow based on the attached figures.

Figure 9:
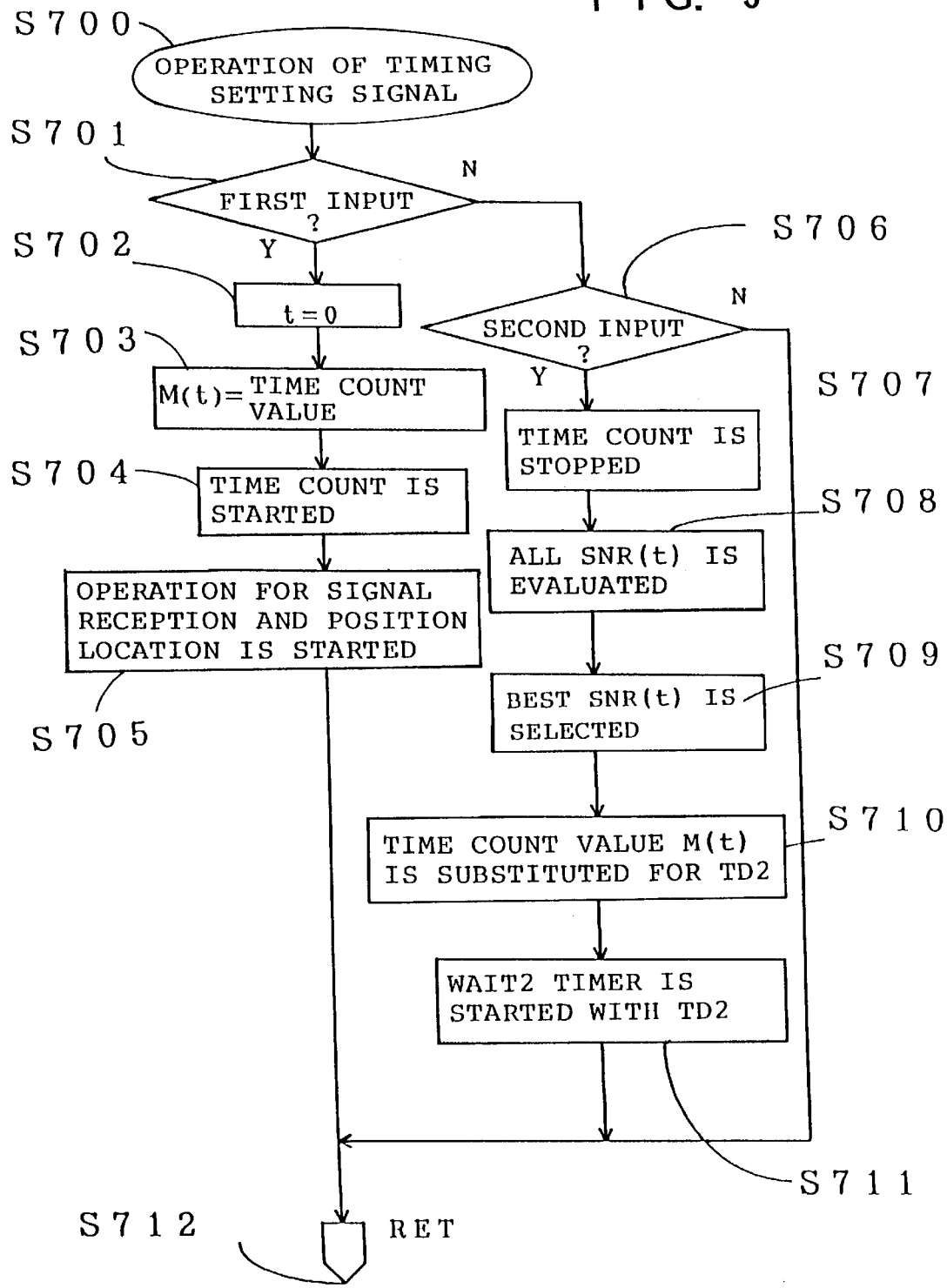
FIG. 9 is a flowchart illustrating the operation of an embodiment of the GPS receiving apparatus of the present invention.
Figure 10:
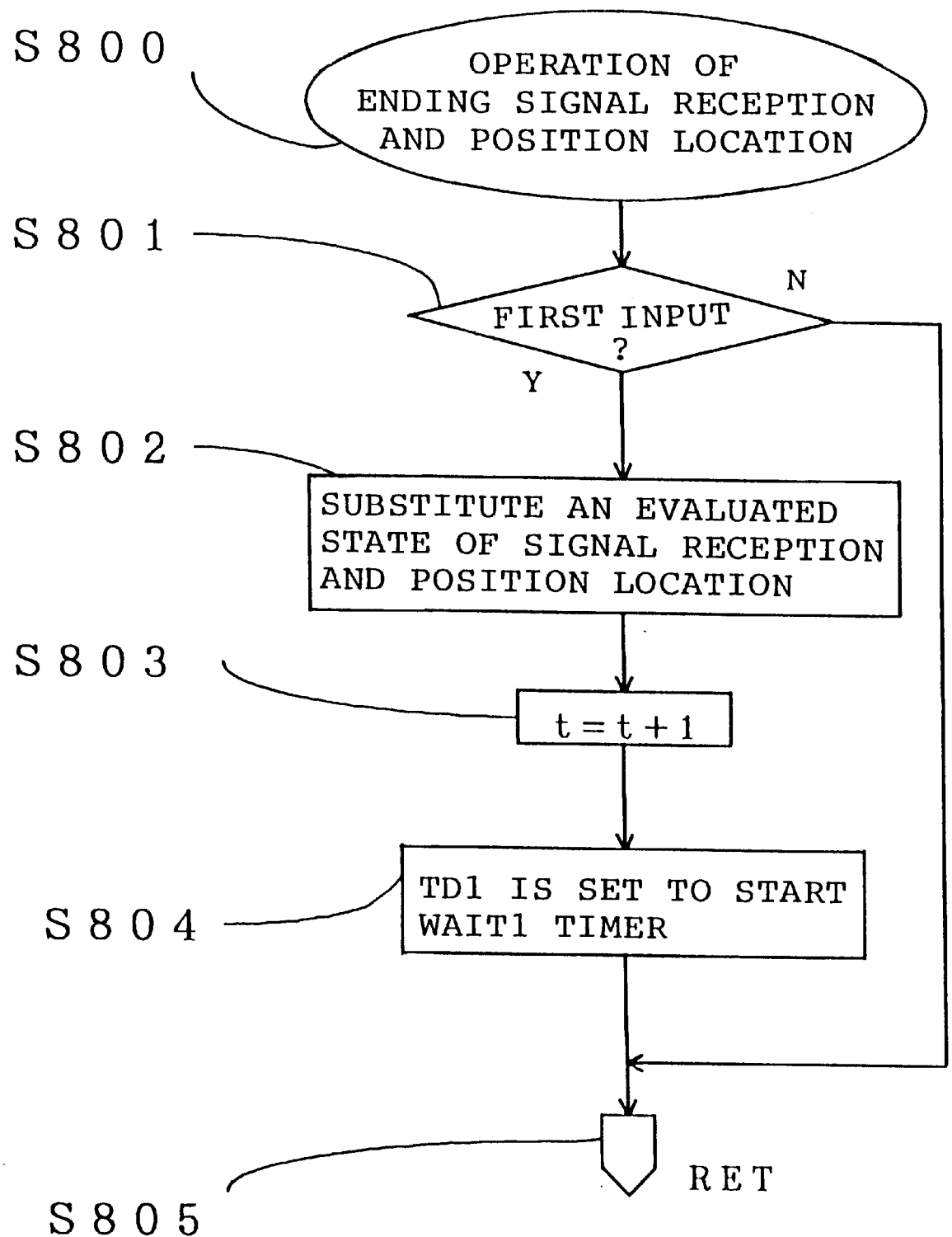
FIG. 10 is another flowchart illustrating the operation of an embodiment of the GPS receiving apparatus of the present invention.
Figure 11:
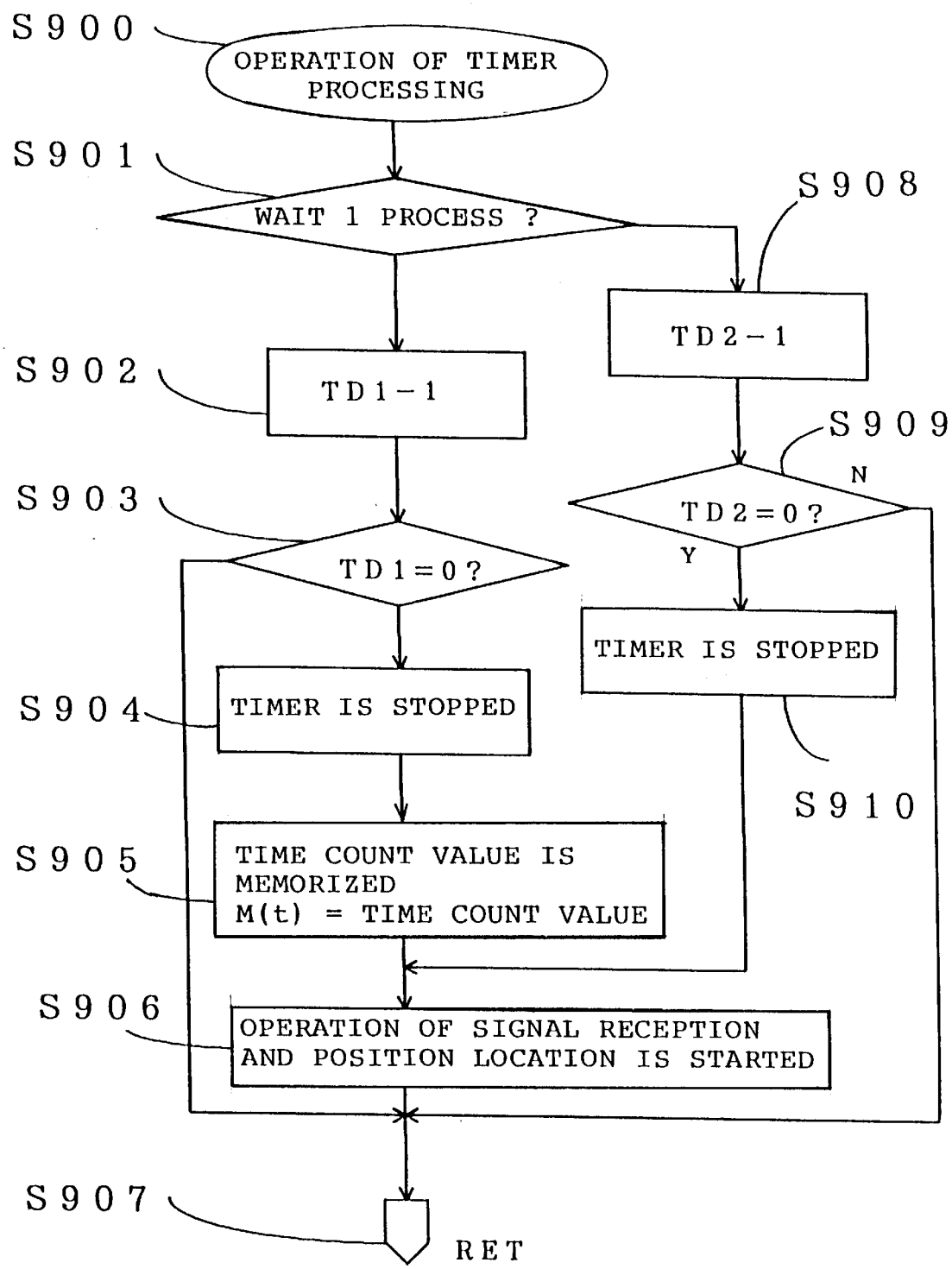
FIG. 11 is yet another flowchart illustrating the operation of an embodiment of the GPS receiving apparatus of the present invention.

FIG. 9, FIG. 10 and FIG. 11 are a flowchart for explaining the receiving and position location operation performed by the GPS receiving apparatus of the invention. FIG. 12, on the other hand, is a timing chart showing the operation. In FIG. 9, when the apparatus is started, a timing signal is waited for from the timing setting means 2. When a timing signal is received, it is determined whether it is a first one or not. If it is a first input, an initial value of a time counting counter is rendered t=0 to memorize a time count value M(t) (S702, S703). Time measurement is started by an internal counter (S704). Then the operation of signal reception and position location is started (S705). The next process is waited for (S712). Here, if the inputting of the timing setting signal is a second one, time counting under measurement is stopped (S707) to single out SNR(t) that is best in receiving sensitivity or accuracy among all SNR(t) data (S708, S709). The time count value M(t) by a t-counter value at that time is substituted for a timer setting value TD2 (S710). It is assumed in this example that the result of SNR(3) be the best, that is, a count value M(3) at t=3 is substituted in TD2. A WAIT2 timer is started with TD2 rendered as a set value (S711). If the input of the arm position detection signal is a third one or later, a WAIT2 timer is started with the timer set value rendered as TD2 (S710, S711). Then FIG. 10 shows the operation of ending signal reception and position location, wherein this processing is carried out each time the one-time operation of signal reception and position location ends. Firstly, it is determined whether or not a first arm position detection signal is being input (S801). If a second or later arm position detection signal is already present, the next process is waited for without performing any process (S805). If a first arm position signal is solely present, the state of signal reception and position location at this time is evaluated to substitute the result for SNR(t) (S802). The counter t for counting the number of signal reception and position location is rendered as t=t+1 (S803). The set value for the timer is rendered as arbitrary TD1 to start a WAIT1 timer (S804). The next process is waited for (S805). Then the operation of timer processing is shown in FIG. 11. Firstly, it is determined whether it is the WAIT1 process or the WAIT2 process (S901) to perform respective subtraction processes (S902, S908). If the respective timers come to time-up, the time count value in measurement at that time point is memorized to be substituted for M(t) (S905). Then a new operation of signal reception and position location is started (S906). This M(t) becomes a beginning time for the new operation of signal reception and position location. The next process is waited for (S907). If the WAIT2 process comes to time-up, the new operation of signal reception and position location is started (S910, S906). This series of operations provides, during operation in the first one time period of arm swinging, a plurality of receiving operation beginning times M(0), M(1), . . . M(t), a plurality of results of signal reception and position location, a plurality of sensitivity and accuracy data SNR(0), SNR(1), . . . SNR(t), with respect to a time point of inputting the first arm position detection signal as a basic point. When the second arm position detection signal is inputted, the plurality of data of signal receiving sensitivity and accuracy are evaluated. The signal receiving operation beginning time M(t) that is best in result is rendered a WAIT time from a time point of being inputted of second arm position detection signal and the later. After the M(t) time, it is possible to receive at all times a signal at a particular best-suited signal receiving position in one time period of arm swing motion.

Furthermore, when the third arm position detection signal or the later is inputted, it is possible to receive under a new condition a signal at a particular best-suited receiving position in one time period of arm swing motion by rendering the number of inputs of arm position detection signals as 0 for initialization with an arbitrary condition applied. The new condition may be by a timer wherein initializing is made by rendering 0 the number of inputs of the arm position detection signals at a given time interval.

Furthermore, there may provided a pitch number converting means for converting a periodic signal outputted by the timing setting means into a pitch signal per unit time, and an optimum receiving control means for causing an optimum receiving state detecting means to operate. Besides, it is possible to provide a directional vector change detecting means for controlling the optimum receiving state detecting means based on change of a directional vector in speed information measured by the GPS signal receiving means. Furthermore, it is also possible to provide a receiving quality evaluating means for evaluating the quality of received data as receiving result measured by the GPS signal receiving means so as to control for reinvestigation on optimal receiving state when the receiving state is poor.

As explained hereinbefore, the present invention comprises an arm swing detecting means for detecting human arm swinging pitch signal, and a timing setting means for setting particular timing within one period of the output periodic signal of the arm swing detecting means, to perform speed measurement at particular timing that the speed of arm swing within one arm swing motion equals the speed of body movement, providing an effect of enabling speed measurement with accuracy and at low power consumption with the affection by arm swinging cancelled. Also, according to the present invention, it is possible to automatically set favorable signal receiving timing in signal reception under running, offering an effect of improving the stability of measurement.

What is claimed is:

1. A GPS receiving apparatus comprising: time counting means for counting time and generating a reference clock signal; input means for controlling the beginning of a GPS signal receiving operation; GPS signal receiving means mountable on a user's arm for receiving a GPS signal from a GPS satellite; display means for displaying time information output by the time counting means and at least one of position information and speed information based upon an output of the GPS signal receiving means; arm swing detecting means for detecting periodic arm swinging motion of the user's arm while walking or running and outputting a corresponding periodic signal; timing setting means for setting a predetermined time during respective arm swing movements at which a GPS signal receiving operation will be performed based upon the periodic signal output by the arm swing detecting means; and position location control means for controlling operation timing of the GPS signal receiving means based on the output signal of the timing setting means so that a GPS signal receiving operation is performed at the same time during each cycle of periodic arm swinging motion to thereby cancel the effect of the periodic arm swinging motion.

2. A GPS signal receiving apparatus according to claim 1; wherein the timing setting means includes means for controlling the position location control means based on the periodic signal output by the arm swing detecting means and the reference clock signal generated by the time counting means.

3. A GPS signal receiving apparatus according to claim 1; further comprising moving distance calculating means for determining a moving distance of the GPS signal receiving means based upon speed information intermittently measured based upon GPS signal data received by the GPS signal receiving means in response to an output signal of at least one of the time counting means and timing setting means.

4. A GPS signal receiving apparatus according to claim 1; wherein the timing setting means includes pitch number converting means for converting a periodic signal output by the timing setting means into a unit-time pitch signal, and wherein the position location control means includes means responsive to an output of the pitch number converting means to control the GPS signal receiving means to receive a GPS signal at the same time during each cycle of periodic arm swinging motion.

5. A GPS receiving apparatus comprising; time counting means for counting time and generating a reference clock signal; input means for controlling the beginning of a GPS signal receiving operation; GPS signal receiving means mountable on a user's arm for receiving a GPS signal from a GPS satellite; display means for displaying time information output by the time counting means and at least one of position information and speed information based on an output of the GPS signal receiving means; arm swing detecting means for detecting periodic arm swinging motion of the user's arm while walking or running and outputting a corresponding periodic signal; timing setting means for setting a predetermined time during respective arm swing movements at which a GPS signal receiving operation will be performed based upon the periodic signal output by the arm swing detecting means; and position location control means for controlling operation timing of the GPS signal receiving means based on the output signal of the timing setting means and a clock signal from the time counting means so that a GPS signal receiving operation is performed at the same time during each cycle of periodic arm swinging motion to thereby cancel the effect of the periodic arm swinging motion; and optimum receiving state detecting means for conducting an optimum receiving state detecting operation to determine an optimum timing for operation of the position location control means by conducting a plurality of operations of the GPS signal receiving means within one period of an output signal of the timing setting means and determining which operation is the most accurate.

6. A GPS signal receiving apparatus according to claim 5; wherein the optimum receiving state detecting means includes means for performing an optimum receiving state detecting operation at an arbitrary constant time interval based on the reference clock signal from the time counting means.

7. A GPS signal receiving apparatus according to claim 5; further comprising pitch number converting means for converting a periodic signal output by the timing setting means into a unit-time pitch signal, and optimum receiving control means for controlling the operation of the optimum receiving state detecting means based on output data of the pitch number converting means.

8. A GPS signal receiving apparatus according to claim 5; further comprising directional vector change detecting means for controlling the operation of the optimum receiving state detecting means based on a change in a directional vector of position information measured by the GPS signal receiving means.

9. A GPS signal receiving apparatus according to claim 5; further comprising receiving quality evaluating means for controlling the operation of the optimum receiving state detecting means based on a detected change in received data quality measured by the GPS signal receiving means.

10. A GPS receiving apparatus according to claim 1; wherein the arm swing detecting means comprises an arm swing detecting circuit having an acceleration sensor for detecting periodic arm swing movement and producing a corresponding signal, an amplifier for amplifying the signal, a bandpass filter for filtering unwanted noise from the output of the amplifier, and a reference voltage generating circuit for supplying a reference voltage to at least the arm swing detecting circuit and the amplifier.

11. A GPS receiving apparatus according to claim 10; wherein the acceleration sensor comprises a cantilever-mounted piezoelectric element attached to the user's arm so as to be responsive to swinging movement of the user's arm.

12. A GPS receiving apparatus according to claim 1; wherein the timing setting means comprises a reference voltage generating circuit and a waveform shaping circuit for converting the periodic output signal of the arm swing detecting means into a digital signal based upon a reference voltage supplied by the reference voltage generating circuit.

13. A GPS receiving apparatus according to claim 12; wherein the waveform shaping circuit comprises a hysteresis comparator for comparing the periodic output signal of the arm swing detecting means and the reference voltage and generating the digital output signal as a logic "0" or a logic "1" output depending upon the comparison result, such that the periodic output signal of the arm swing detecting means is converted to a periodic series of pulses.

14. A GPS receiving apparatus according to claim 12; wherein the timing setting means further comprises a digital counter responsive to an output of the hysteresis comparator for outputting a signal a predetermined amount of time after a signal is output by the hysteresis comparator.

15. A GPS receiving apparatus according to claim 1; wherein the position location control means and the time counting means comprise a programmed CPU.

16. A GPS receiving apparatus according to claim 1; further comprising optimum receiving state detecting means for conducting an optimum receiving state detecting operation to determine an optimum timing for operation of the position location control means by conducting a plurality of operations of the GPS signal receiving means within one period of an output signal of the timing setting means and determining which operation is the most accurate.

17. A GPS receiving apparatus comprising: GPS signal receiving means for receiving a GPS signal and being mountable on a user's arm for monitoring the user's position; display means for displaying information based upon an output of the GPS signal receiving means; arm swing detecting means for detecting periodic swinging motion of the user's arm and outputting a corresponding periodic signal; timing setting means for setting a predetermined time during respective arm swing movements at which a GPS signal receiving operation will be performed based upon the periodic signal output by the arm swing detecting means; and position location control means for controlling operation timing of the GPS signal receiving means based on the output signal of the timing setting means so that a GPS signal receiving operation is performed at the same time during each cycle of periodic arm swinging motion to thereby cancel the effect of the periodic arm swinging motion.

18. A GPS signal receiving apparatus according to claim 17; further comprising means for calculating moving speed based upon received GPS signals.

19. A GPS receiving apparatus according to claim 17; further comprising time counting means for counting time and generating a reference clock signal.

20. A GPS receiving apparatus according to claim 17; further comprising optimum receiving state detecting means for conducting an optimum receiving state detecting operation to determine an optimum timing for operation of the position location control means by conducting a plurality of operations of the GPS signal receiving means within one period of an output signal of the timing setting means and determining which operation is the most accurate.

\* \* \* \* \*